United States Patent [19]

Olson et al.

[11] Patent Number: 4,738,571
[45] Date of Patent: Apr. 19, 1988

[54] ROUTING APPARATUS WITH DUST EXTRACTION SYSTEM

[76] Inventors: Eugene T. Olson, 1250 135th Ave. NE., Anoka, Minn. 55303; Larry E. Olson, 1149 129th Ave. NE., Blaine, Minn. 55434

[21] Appl. No.: 426,744

[22] Filed: Sep. 29, 1982

[51] Int. Cl.$^4$ .......................... B23C 1/20; B23B 47/34
[52] U.S. Cl. .................................... 409/137; 408/67; 408/710; 409/182
[58] Field of Search ............... 409/182, 185, 134, 137, 409/190; 408/67, 710; 51/273; 83/100, 563; 144/252 R, 252 A, 136 R; 29/DIG. 84

[56] References Cited

U.S. PATENT DOCUMENTS

| | | | |
|---|---|---|---|
| 2,544,841 | 3/1951 | Fontaine | 144/252 R |
| 2,944,465 | 7/1960 | Jones | 409/137 |
| 3,167,260 | 1/1965 | Gibbons et al. | 29/DIG. 84 X |
| 3,770,031 | 11/1973 | Olson | 83/471 R X |
| 3,786,846 | 1/1974 | Mehring | 144/252 R X |
| 3,880,047 | 4/1975 | Dosier | 83/100 X |
| 3,905,273 | 9/1975 | Shook | 409/134 |
| 4,088,164 | 5/1978 | McCord, Jr. | 51/273 X |
| 4,090,297 | 5/1978 | Wanner et al. | 51/273 X |
| 4,158,987 | 6/1979 | Smith | 409/190 X |
| 4,184,226 | 1/1980 | Loevenich | 408/67 X |
| 4,239,428 | 12/1980 | Berzina | 409/185 X |
| 4,253,362 | 3/1981 | Olson | 144/252 R X |
| 4,409,699 | 10/1983 | Moorhouse | 144/252 R X |

Primary Examiner—William R. Briggs
Attorney, Agent, or Firm—Peterson, Wicks, Nemer & Kamrath

[57] ABSTRACT

In a preferred form, the dust extraction system is intended to be used in combination with a conventional router. The system includes a plate, one side of which confronts the router's ring base. The plate has a relatively small hole through which the cutter bit extends and an offset larger hole through which dust-laden air is withdrawn. A recessed sub base, preferably of plastic, confronts the other side of the plate, the sub base also having a relatively large hole through which the bit extends. Both the plate and the sub base conform in shape to each other, having portions extending laterally to one side of the router's base. The offset hole in the plate is formed in its laterally extending portion and the recess or cavity in the sub base, forming a passage with the overlying plate, extends to this hole. A sleeve surrounding the hole enables a source of subatmospheric pressure to be connected in order to extract the dust produced by the router's bit. Provision is made for mounting the router for reciprocal movement toward and away from a frame on which the work is placed. An actuating mechanism which includes a spring normally biases the router in the direction of the frame and the work disposed thereon, the sub base having a beveled edge so that the spring action can be overcome when the work is moved against the beveled edge.

11 Claims, 4 Drawing Sheets

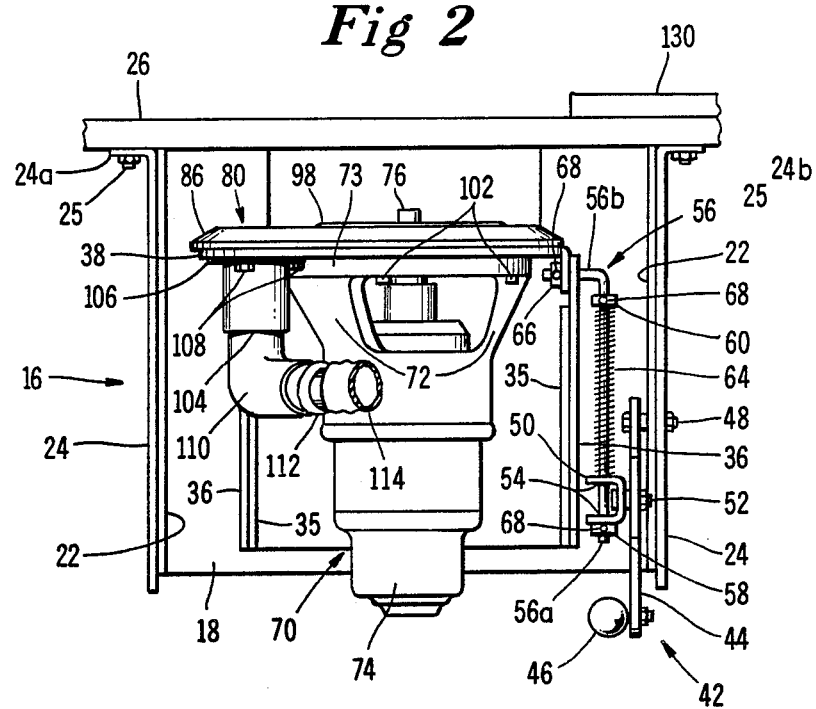
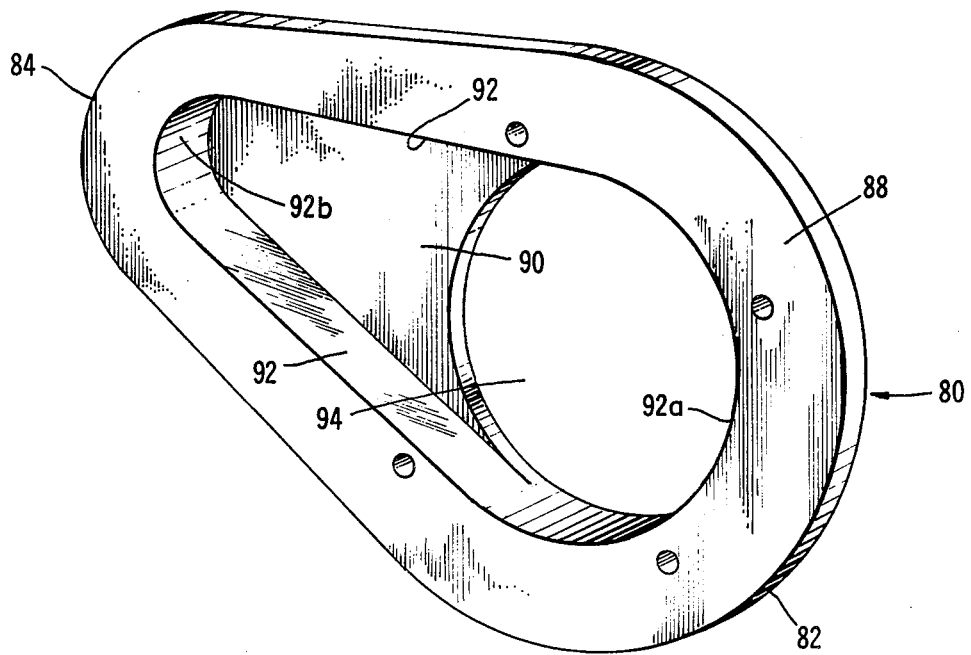

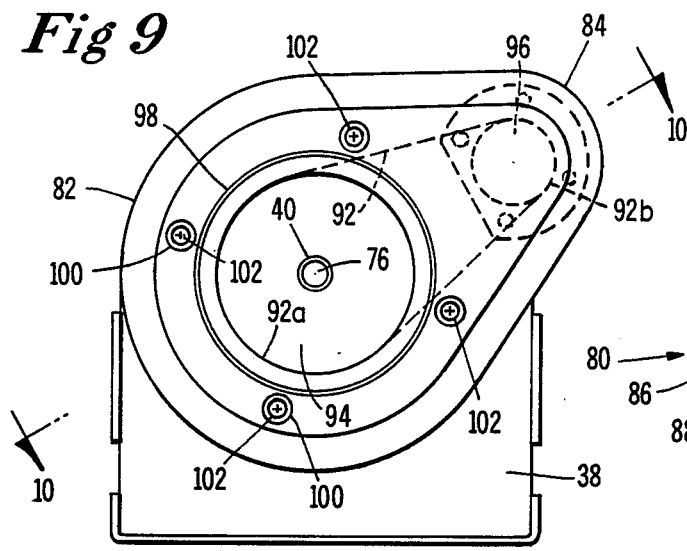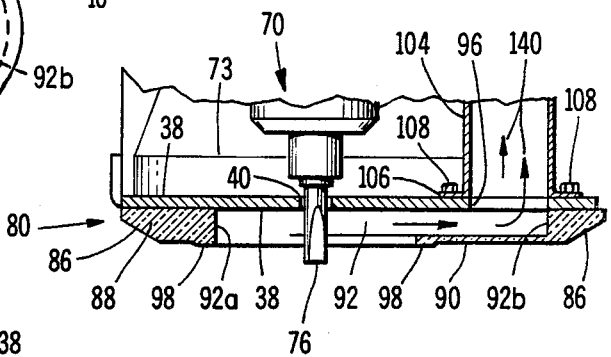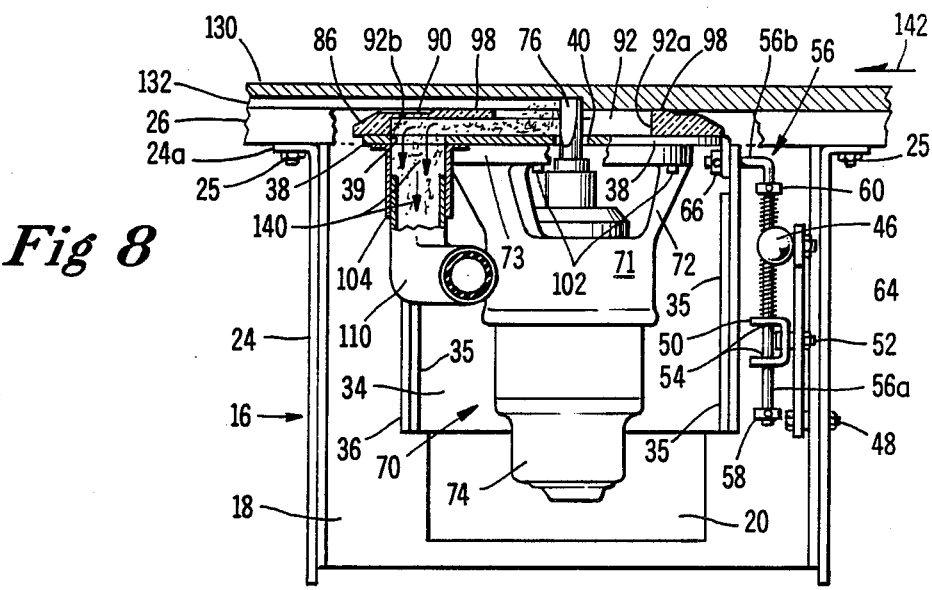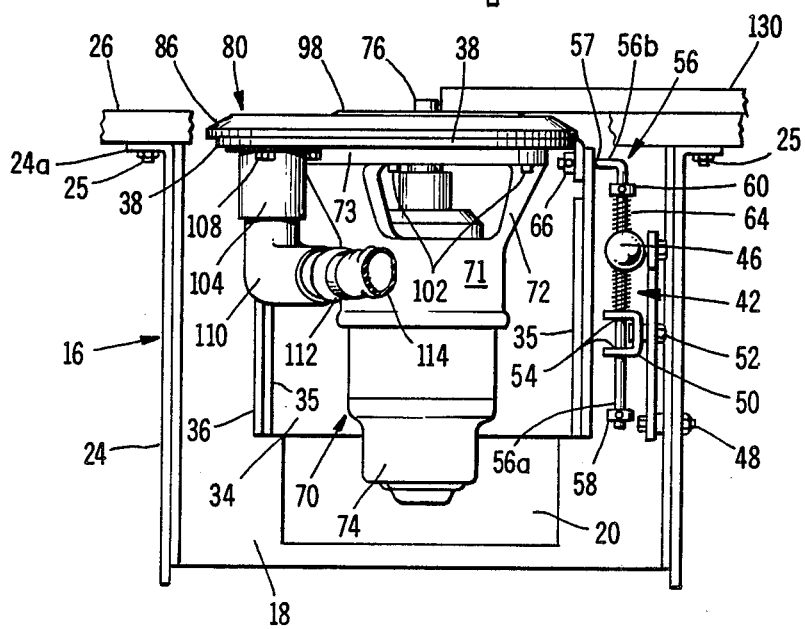

ROUTING APPARATUS WITH DUST EXTRACTION SYSTEM

BACKGROUND OF THE INVENTION

1. Field of the Invention

This invention relates generally to routing, and pertains more particularly to routing apparatus utilizing a dust extraction system and an adjusting mechanism for positioning the apparatus relative to the work to be routed.

2. Description of the Prior Art

Dust removal and collection systems have been devised for various types of power tools. For example, the system described in U.S. Pat. No. 4,253,362, granted to Larry E. Olson on Mar. 3, 1981 for "APPARATUS FOR COLLECTING SAWDUST PRODUCED BY A CIRCULAR POWER SAW" has performed very satisfactorily in actual practice for that particular equipment. However, the effective removal or extraction of dust when performing routing operations has posed a problem that has not been satisfactorily solved insofar as we are aware, especially when using a conventional router. Where the router is hand held, the use of a hood or extra housing would interfere with the routing operation. Where fixtures are used for mounting the router, it is also quite difficult to employ any type of enclosure; this should be evident from U.S. Pat. No. 3,770,031 issued on Nov. 6, 1973 to Eugene T. Olson for "ROUTING FIXTURE". Without a satisfactory extraction system, the trade has simply put up with the dust problem, even though extremely annoying and deleterious to the operator's health.

SUMMARY OF THE INVENTION

Accordingly, an important object of our invention is to provide an extraction system for use with a conventional router. In this regard, an aim of the invention is to provide a sub base that can be attached to a router without modification of the router.

A more specific object of our invention is to use a conventional router in the same manner as done heretofore, but to effect a removal of the dust created by the rotating cutting bit by originating the removal of the dust at a proximal location relative to the bit, doing so before the dust has been even partially dispersed into the atmosphere.

Another object of the invention is to provide total dust control where a conventional router is either hand held or mounted on a carriage associated with a frame for supporting a panel, board or plate to be routed.

Yet another object is to provide a means for mounting a conventional router on a platform that can be shifted toward and away from a board, panel or plate placed on a frame without interfering with the effective removal of dust resulting from the routing operation.

Another object of the invention is to provide an actuating mechanism for moving the router along the axis of the rotating cutting bit without adversely affecting the extraction of dust resulting from the routing operation. In this regard, it is planned that the actuating mechanism determine the position of the router relative to the work, and that the dust extraction system, by reason of the subatmospheric pressure utilized in conjunction therewith, assist in maintaining the router in an operable relationship with respect to the work.

Our invention has for still another object the movement of the router relative to the work, or conversely the work relative to the router, without detracting from the effectiveness of the dust extraction system that we have devised.

Another object of the invention is to provide an extraction system that lends itself readily to use with a typical shop-type vacuum cleaner and the flexible hose associated therewith. More specifically, an aim of the invention is to provide an offset outlet having a sleeve associated therewith to which the flexible hose can be easily attached by means of an appropriate clamp.

Still further, an object of our invention is to provide an actuating mechanism that can be readily manipulated into various positions in the conducting of router operations where the work is mounted on a frame. More specifically, it is intended that our actuating mechanism be initially in a locked-out condition in which the router is fully retracted and finally in a locked-in relationship in which the router is fully advanced and automatically held against the work. Between these positions the operator can realize a free float condition and a condition where the spring exerts a force determined by the operator, any of these various positions or conditions being quickly and readily achieved.

The invention also has as an object the provision of a beveled edge on the sub base employed when practicing our invention which beveled edge causes our routing apparatus to automatically adjust itself, a coil spring yielding or compressing when an edge of the work to be routed is moved against the beveled edge. In this way, one does not first have to position the work prior to a routing operation, for the router is properly positioned relative to the work by the work itself.

Briefly, our invention envisages the employment of a sub base, preferably of plastic so as to minimize friction, which sub base is recessed to form a passage with respect to a plate sandwiched between the sub base and the ring base of the router itself. Both the sub base and the intervening plate project laterally to one side of the router, the plate having an offset hole or opening so that when a vacuum cleaner is attached thereto air will be drawn from the groove being routed into the passage and out through the hole or opening connecting to the vacuum cleaner. The intervening plate is integral with a platform that is reciprocally shiftable on a carriage constrained for movement up and down relative to the frame on which the work is placed. An actuating mechanism enables the entire platform and the plate to be shifted toward and away from the work, there being a spring that biases the router and its cutting bit in the direction of the work, the spring action being supplemented by the subatmospheric pressure utilized in the extraction of dust from the groove as the groove is being formed.

BRIEF DESCRIPTION OF THE DRAWINGS

FIG. 2 is a top plan view of the routing apparatus shown in FIG. 1, the actuating mechanism being in a locked-out condition having retracted the routing apparatus;

FIG. 7 is a view similar to FIG. 6 but with the routing apparatus actually deflected by the work and with the work adjacent the routing bit;

FIG. 8 is a top plan view corresponding to FIG. 5, a routing operation being in progress;

FIG. 9 is a rear elevational view, the view being in a direction away from the work and toward the operator;

FIG. 10 is a sectional view taken in the direction of line 10—10 of FIG. 9, and

FIG. 11 is a perspective view of the sub base seen in FIGS. 9 and 10, the view being taken from the opposite side of that seen in FIG. 10.

DESCRIPTION OF THE PREFERRED EMBODIMENT

Figure 1:
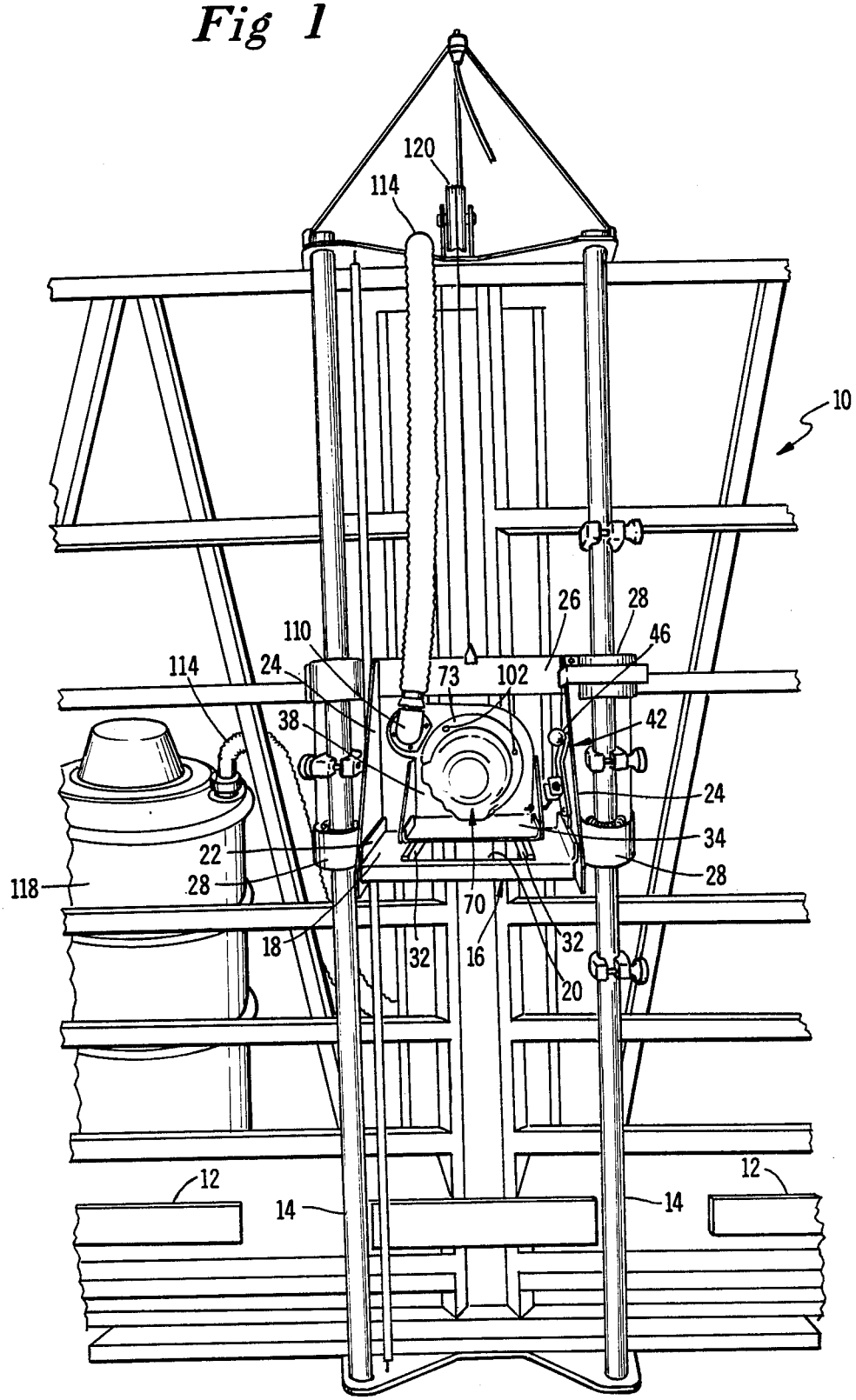
FIG. 1 is a perspective view (virtually a front elevational view) depicting a routing apparatus exemplifying our invention.

Although not actually a part of our invention, it will be helpful in understanding the benefits to be derived therefrom to show fragmentarily a frame 10 having a work support 12 at the bottom thereof. The frame 10, it can be mentioned, may be similar or identical to the frame illustrated in U.S. Pat. No. 3,565,139 granted on Feb. 23, 1971 to Eugene T. Olson for "ANGULARLY SHIFTABLE SAW MOUNT".

Mounted on the forward side of the frame are vertical standards or rails 14 forming a track for a slideable carriage denoted generally by the reference numeral 16. The carriage 16 comprises a horizontal plate 18 having a rectangular opening at 20. Adjacent each side of the plate 18 is an upstanding flange 22. Appropriately secured to the flanges 22, such as by welding or bolts (not shown) are triangularly configured side plates 24 having an outturned flange 24a at the edge thereof away from the viewer. In the present situation, as can be discerned from FIGS. 2, 6, 7 and 8, nuts and bolts 25 anchor the upper ends of the flanges 24a to an upper cross strip 26 (and additional nuts and bolts 25, which are not visible, anchor the lower ends of the flanges 24a to a lower cross strip 26). The carriage 16 is tracked by the rails 14 for vertical movement, there being bearings 28 mounted on the ends of the strips 26, the bearings encircling the rails 14.

Figure 6:
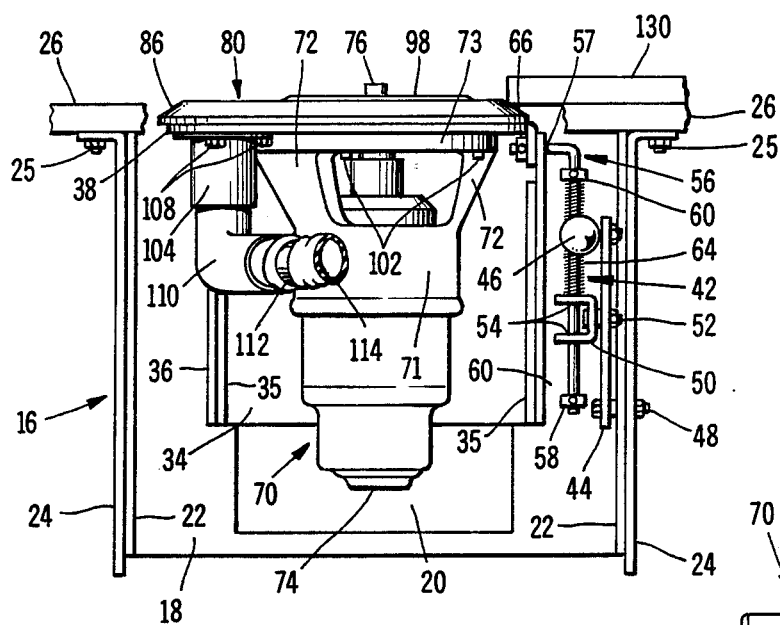
FIG. 6 is a top plan view with the routing apparatus fully advanced, the view depicting the apparatus just prior to being deflected by a board or panel being moved to the left.

Marginally located along the edges of the plate 18 adjacent the opening 20 are tracks or guides 32. In FIGS. 6, 7 and 8, however, the tracks 32 have been omitted for drafting simplicity and clarity. These tracks or guides 32 extend into circumferential grooves formed on wheels (not shown) journaled beneath a platform 34. All that need be understood is that the platform 34 is constrained for horizontal movement toward and away from the plane of the frame 10 by means of the tracks 32 and the wheels journaled beneath the platform 34. The reciprocally mounted platform 34 has upstanding flanges 35 at each side thereof which are attached to triangular side plates 36, such as by means of welding or bolts (not shown).

Playing an important role in our invention is an upstanding plate 38 that in the present embodiment is integral with the rear edge of the reciprocal platform 34. As the description progresses, it will become manifest that the plate 38 can be separate and distinct from the platform 34, particularly when a hand-held routing operation is to be performed, as will be better understood hereinafter. At this time, though, attention is directed to a rather small hole 40 in the plate 38, this hole appearing in FIGS. 8-10.

Included in our invention is an adjusting or actuating mechanism 42 comprising an arm 44 having a knob at one end thereof. The arm 44 is mounted on a pivot or bolt 48 that extends through one of the triangular side plates 24, this being the particular plate 24 at the right as seen in FIGS. 2, 6, 7 and 8.

The mechanism 42 further includes a clevis or U-shaped member 50 having a pivot or bolt 52 extending through the bight portion thereof and a portion of the arm 44. Although not completely clear from the drawings, it should be explained that the legs of the clevis 50 have holes at 54.

The clevis 50, through the agency of the holes 54, slideably support an L-shaped rod 56 (best viewed in FIGS. 2, 4, 7 and 8), more specifically, the longer leg labeled 56a. The shorter leg 56b of the L-shaped rod 56 extends through a hole at 57 (see FIG. 3) in the triangular side plate 36 at the left, as viewed in FIGS. 2, 6, 7 and 8. The longer leg 56a has a pair of collars 58 and 60 mounted thereon, the collars each having a set screw 68 so that the collars 58, 60 can be positioned at any preferred location on the leg 56a.

Figure 5:
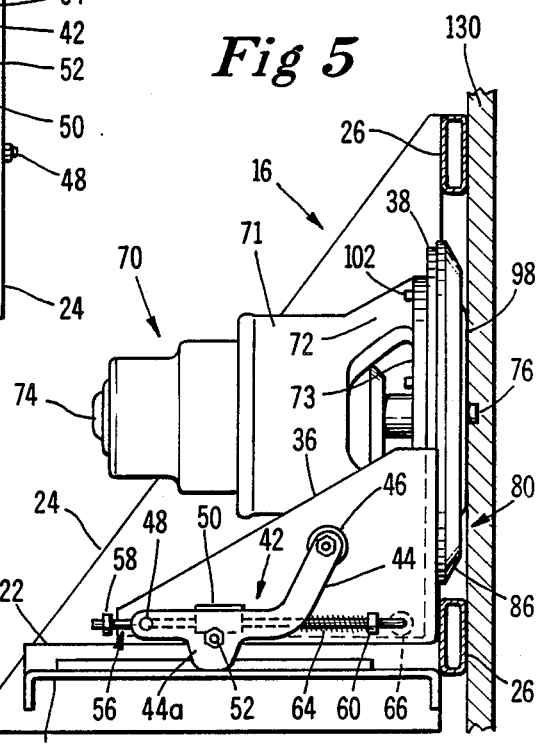
FIG. 5 is a side elevational view with the routing apparatus fully advanced and in the process of forming a groove in a panel or board, the adjusting mechanism being in its locked-in condition.
Figure 4:
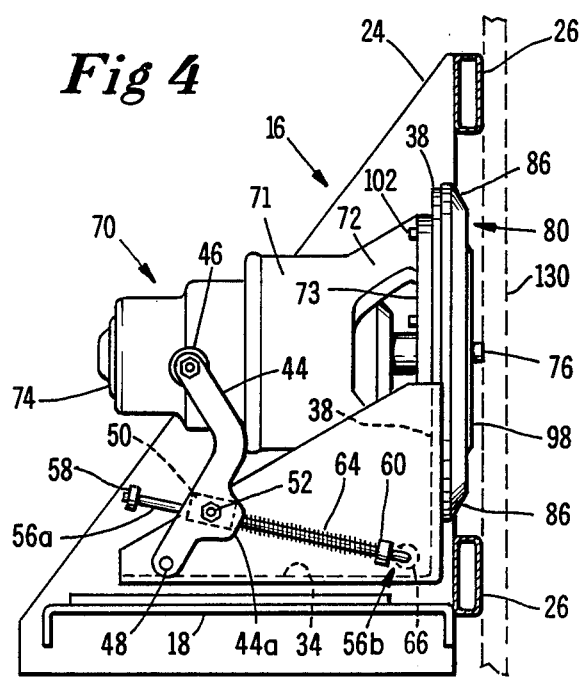
FIG. 4 is a side elevational view similar to FIG. 3 but with the actuating mechanism being in an intermediate position during which the routing apparatus is being advanced under the control of the operator.
Figure 3:
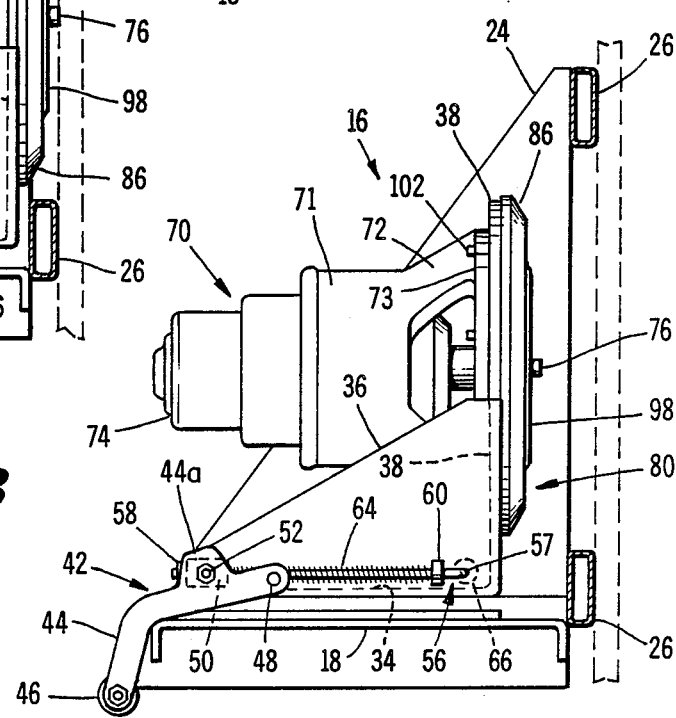
FIG. 3 is a side elevational view corresponding to FIG. 2.

It will be perceived that there is a coil spring 64 that encircles the leg 56a of the L-shaped rod 56, one end of the coil spring 64 bearing against one leg of the clevis 50 and the other end of the coil spring 64 bearing against the collar 60. Still another collar 66 is anchored to the end of the leg 56b by means of still another set screw 68. As most readily understood from FIGS. 3-5, the coil spring 64 is progressively compressed as the arm 44 is manually rotated by the knob 46 in a clockwise direction from the locked-out position in which it is shown in FIG. 3 to the locked-in position that is shown in FIG. 5, FIG. 4 being a transitory position of the arm 44 in which the operator is controlling the force.

Even though the present invention makes use of a conventional router, it will do no harm to describe in a general manner the construction of such a router. Therefore, it will be noted that the router has been indicated generally by the reference numeral 70. It includes a casing 71 having integral legs 72 that extend to a ring base 73. The router 70 further includes an electric motor 74 which is used to rotate a cutter or bit 76 about a longitudinal axis perpendicular to the general plane of the frame 10. It will be appreciated that the casing 71, legs 72 and ring base 73 are moved relative to the motor 74 and the bit 76 so as to extend or retract the bit with respect to the ring base 73. This feature is conventional in present day router designs. Whereas a typical router 70, when hand held or mounted in a fixture, has a plastic ring attached to its underside, that is, the right side as viewed in FIGS. 3, 4 and 5, in order to reduce friction between the router and the work, such plastic ring is not used when practicing our invention. Consequently, it does not appear in any of the drawings.

Attention is now directed to a sub base 80. This replaces the plastic ring mentioned in the paragraph just above and when fabricated from plastic, such as transparent acrylic, it serves a dual purpose as will now be made manifest. It will be helpful to describe the sub base 80 in considerable detail. Thus, as can be readily understood from FIGS. 9 and 11, the sub base 80 includes what will be termed a large radius portion 82 and a small radius portion 84. The respective peripheries of the portions 82 and 84 are formed with a bevel 86 (located on the far side in FIG. 11, but visible in FIGS. 2-10). The purpose of the bevel 86 will be explained shortly.

At this time, it is to be observed that there is a relatively thick portion 88 within the boundaries of the larger radius portion 82. In other words, the large radius portion 82 is quite thick as can be seen from the lower portion of FIG. 10 and as just mentioned this thick portion has been denoted by the numeral 88. There is a relatively thin portion 90 that is within the boundaries of the small radius portion 84. The thin portion 90 is actually formed by reason of a cavity or recess 92. Here again, the cavity or recess 92 conformed generally to the peripheral shape of the portions 82, 84. In this regard, the cavity or recess 92 can be described as having a relatively large radius wall 92a and a relatively small radius wall 92b. It will be observed that the small radius wall 92b is less deep, so to speak, than the large radius wall 92a, thereby forming the thin portion 90. The large radius portion 82 has a large hole 94 therein. However, the plate 38 has the smaller size hole 40 therein in direct alignment with the end portion of the cavity or recess 90, more specifically that end of the cavity or recess 90 defined by the small radius wall 92b. Circumscribing the large hole 94 is an annular rib 98.

Chamfered holes 100 accommodate flat head screws 102, the threaded shanks of which extend through not only the sub base 80 but the plate 38 into the ring base 73. Earlier herein it was mentioned that the ring base 73 had attached thereto a plastic ring to minimize friction when moving relative to the work being routed. The attachment of such a plastic ring has been by means of threaded holes formed in the ring base 73, and the present invention uses these tapped holes to threadedly receive the shanks of the flat head screws 102, as can be understood from FIGS. 2-8.

From FIG. 8 it can be readily seen that the hole 40 in the plate 38 permits the bit 76 to extend therethrough. Of course, the bit 76 also projects through the much larger hole 94 in the sub base 80.

It is important to appreciate that the plate 38 confronts the ring base 73 of the router 70 and that the sub base 80 confronts the opposite side of the plate 38. It is further necessary to recognize that the plate 38 generally conforms in shape to the shape or configuration of the sub base 80. In other words, the sub base 80 has the large radius portion 82 and the small radius portion 84. However, in addition to conforming to the portions 82 and 84 of the sub base 80, the plate 38 extends downwardly to the platform 34, the lower edge of the plate 38 being integral with the forward edge of the platform 34; the forward edge of the platform 34 is the edge that would be located at the right in FIGS. 3, 4 and 5.

Having mentioned the hole 96 in the plate 38, more specifically in the end portion of the plate 38 overlying the smaller end portion 84 of the sub base 80, it will now be explained that a sleeve 104 having a flange 106 secured thereto, such as by brazing, is held in place against the side of the plate 38 that confronts the ring base 73; this is accomplished by means of screws 108 passing through appropriately spaced holes in the flange 106. In this regard, the sleeve 104 extends along an axis actually parallel to the axis about which the cutter or bit 76 rotates. It should be noted, though, that the hole 96 is offset considerably from the axis about which the bit 76 rotates and thus is readily available via the sleeve 104 for removing dust created by the bit 76 when performing a routing operation.

The sleeve 104 is connected to an elbow 110 and a clamp 112 clamps one end of a flexible hose 114 to the elbow 110. The other end of the flexible hose 114 is connected to a shop-type vacuum cleaner 118, the hose 114 in this instance being sufficiently long so as to pass over a counterbalancing mechanism labeled 120.

The frame 10 has already been described as having a work support 12. The purpose of the work support 12 is to support a board, panel or plate indicated by the reference numeral 130. Not visible, however, are rollers associated with the support 12 that enable the work 130 to be easily shifted from the right to left in performing a routing operation. More specifically, when a horizontal groove 132 is to be formed, then the work panel 130 is simply moved to the left from the position in which it fragmentarily appears in FIG. 2 (and also FIG. 6), further movement resulting in the position the work 130 appears in in FIG. 7 and also the further leftward movement producing the relationship appearing in FIG. 8. This movement has been indicated by the arrow 142.

The sequential arrows 140 applied to FIG. 8 indicate the direction of air flow when our dust extraction system is operational. FIG. 8 is an excellent view to examine as far as understanding just how the dust is removed. It will be observed that the groove 132 has been formed by reason of the movement of the work 130 in the direction of the arrow 142. As the groove 132 is formed, the groove itself provides a path for air to flow, being induced to flow therethrough by reason of the vacuum cleaner 118 causing a subatmospheric pressure condition to exist in the region of the cutter or bit 76.

The relatively clean air entering the groove 132 at the left in FIG. 8 passes to the right and as soon as this incoming air reaches the relatively large hole 94 circumscribing the bit 76, it picks up any dust that has been created by virtue of the cutting action of the bit 76, the dust-laden air then being induced to flow through the cavity or recess 92 to the offset hole 96 in the plate 38. In this respect, owing to the cavity or recess 92 facing one side of the plate 38, a passage is formed through which the dust-laden air passes. The dust-laden air, as indicated by the arrows 140, is then pulled through the hole 96 in the overlying plate 38 into the sleeve 104 and then through the elbow 110 into the hose 114 through which it continues to flow until it reaches the vacuum cleaner 118.

The manner in which my adjusting or actuating mechanism 42 is manipulated should be fairly straightforward. From FIG. 2, which figure corresponds to FIG. 3 as far as the retracted or initial condition of the mechanism 42 is concerned, shows the router 70 and its bit 76 well away from the work 130. When the operator grasps the knob 46 in the retracted position in which it appears at the left in FIG. 3 and then rotates the arm 44 in a clockwise direction about the pivot 48. This causes the coil spring 64 to be progressively compressed, but only enough to advance the router 70 and the platform 34 on which it is mounted toward the frame 10, the intermediate position of the arm 44 in FIG. 4 indicating that the spring 64 is undergoing some compression at this transitory point. The work is shown only phantomly in FIG. 4 in order to emphasize the operator's degree of control of bit movement via the spring 64. Comparison of FIG. 4 with FIG. 6 will show that the adjusting or actuating mechanism 42 has advanced the bit 76 just as far as is possible with the depth of cut setting of the motor 74 and its bit 76 relative to the casing 71 and its ring base 73. The relative adjustment of the bit 76 in relation to the casing 71 has not been portrayed, for it is conventional. It has already been stated that the entire casing 71 moves relative to the bit, thus controlling the depth of cut made by the bit 76. Once adjusted, however, then it is the relative movement of the platform 34 relative to the plate 18 of the slideable carriage 16 that initiates and determines the depth of a routing operation.

Even though in FIG. 6 the adjusting mechanism 42 has been positioned so as to urge the sub base 80 to its fullest extent in the direction of the plane of the frame 10, it will be appreciated that when the work 130 is moved against the beveled edge 86, this acts against the sub base 80 so as to force it slightly in a retracted direction, the coil spring 64 readily compressing slightly more to enable this to occur. Stated somewhat differently, the axis of rotation of the bit 76 is perpendicular to the plane in which the work 130 is moved. The bevel 86 provides a camming surface that the left edge of the work 130 can press against to literally cam the entire router 70 toward its retracted position. While this is only a fraction of an inch, nonetheless, it readily accommodates and automatically adjusts itself for initiating a cut when the actuating or adjusting mechanism is in its locked-in condition.

Once the work 130 has acted against the beveled edge 86 of the sub base 80, then the further leftward movement of the work 130 passes over the rib 98 and from FIG. 7 it will be seen that it is the distance the bit 76 projects beyond the annular rib 98 that determines the depth of cut. Thus, when the left edge of the work 130 engages the annular rib 98, there is still a very slight additional compressing of the coil spring 64.

What is perhaps not readily apparent is that once the work 130 has engaged the cutter or bit 76, then the coil spring 64, owing to its compressed state, urges the sub base 80 against the work 130. This action is supplemented by the subatmospheric pressure created by the vacuum cleaner 118. This reduced pressure in the immediate vicinity of the bit 76 literally draws the sub base 80 against the work 130, thereby augmenting the pressural action produced by the compressed spring 64.

Thus, it should be recognized that when the knob 46 as in the position shown in FIGS. 2 and 3, then the adjusting mechanism 42 is in what might be termed a locked-out position, for then the arm 44, owing to the fact that the clevis 50 is pinned thereto, pulls the clevis 50 against the collar 58 to draw the L-shaped rod 56 in a retracted direction. The leg 56b of the rod 56 passes through a hole 57 in the triangular plate 36 to cause the platform 34 to be retracted. Of course, the platform 34 has the plate 38 integral therewith and the plate 38 has the router 70 mounted thereto by reason of the screws 102.

In contradistinction, a locked-in relationship is established when the arm 44 has been rotated clockwise to its fullest extent by the knob 46, the lug 44a then striking the carriage plate 18. This position is shown in FIG. 5, the compression of the coil spring 64 being determined by the position of the clevis 50 with respect to the collar 60. Since the clevis 50 is pivotally mounted on the arm 44 at 52, the spring 64 acts against the collar 60 to urge the collar 60 and the L-shaped rod 56 in a direction to cause the plate 36 to be moved in a direction toward the work 130. However even though this locked-in relationship is established when the lug 44a engages the plate 18, the coil spring 64 compresses further when the work 130 cams against the bevel edge 86 on the sub base 80.

As already alluded to, the vacuum within the cavity or recess 92 (actually forming a passage due to the overlying plate 38) operates to assist the action of the spring 64 under the conditions described immediately above, thereby assuring excellent pressural engagement of the sub base 80 against the work 130, more specifically, engagement of the annular rib 98 with the work 130 in that the rib 98 is integral with the sub base 80. The router bit 76, which projects a selected distance beyond the plane of the rib 98, remains in a forward or advanced relation that is sufficiently firm, yet yieldable to the extent permitting by the biasing action of the spring 64, so that a uniform depth of cut is effected when forming the groove 132. Stated somewhat differently, under these conditions the spring 64 exerts a sufficient force which is supplemented by the vacuum produced by the vacuum cleaner 118 to assure that the bit 76 remains advanced to the extent required for a given depth of groove 132.

We claim:

1. In combination with a router having a bit rotatable about a longitudinal axis and a router base residing in a plane generally perpendicular to said axis, said router base forming an opening through which said bit extends, a dust extraction system comprising a generally flat plate having one face thereof confronting said router base and having a portion thereof projecting laterally away from said router base, said generally flat plate having a relatively small first hole closely adjacent to the bit and through which said bit also extends and a larger second hole in said laterally projecting portion, and generally flat sub base means confronting the other face of said generally flat plate means, and generally coextensive therewith, said generally flat sub base means being thicker than said plate and having a third hole through which said bit extends, said third hole being larger than said first hole so that dust can pass therethrough and a laterally projecting cavity forming a passage with said other face of said generally flat plate which passage extends directly from said first and third holes to the second hole in said generally flat plate, and means detachably connecting said generally flat plate and said generally flat sub base means to said router base, said other face of said generally flat plate means forming one closed side of said passage, whereby, when said second hole is in communication with a subatmospheric pressure source, dust produced from the cutting action of said bit is withdrawn through said passage and second hole.

2. The combination of claim 1 in which the peripheral edge of said sub base means is beveled.

3. The combination of claim 1 in which said sub base means is rigid plastic.

4. The combination of claim 1 in which said detachable connecting means includes a plurality of screws extending through said generally flat sub base means and said generally flat plate into said router base.

5. The combination of claim 1 in which said sub base means has first and second flat faces, said laterally projecting cavity being in the first flat face of said sub base means and said second flat face of said sub base means presenting a unitary and uninterrupted surface for confronting the work to be routed.

6. The combination of claim 4 in which said screws are flat head screws and extend through chamfered holes in said sub base means.

7. A dust extraction system for use with routing apparatus which includes a motor, ring base and a bit extending generally through the center of said ring base, the system comprising a generally flat plate having first and second oppositely facing smooth flat surfaces and a generally flat sub base having aligned holes therein through which the bit extends when the first surface of said generally flat plate confronts the side of said ring base remote from said motor and the second surface of said flat plate confronts said sub base, said sub base underlying the entire second surface of said plate and said sub base having a cavity extending laterally from said holes for fluid connection to a subatmospheric pressure source to form a passage in combination with the second surface of said generally flat plate.

8. A dust extraction system in accordance with claim 7 in which one end of said cavity is adjacent said holes, said plate having another hole adjacent the other end of said cavity to provide said fluid connection to a subatmospheric pressure source, and a sleeve circumjacent said another hole for attachment to a hose in communication with said subatmospheric pressure source, said sleeve projecting along an axis parallel to said motor and in the same general direction of said motor.

9. A dust extraction system in accordance with claim 7 including means for detachably retaining said sub base in juxtaposition with said plate to form said passage.

10. A dust extraction system in accordance with claim 9 in which said detachable means includes a plurality of screws.

11. A dust extraction system in accordance with claim 10 in which each of said screws extends through said sub base and plate to retain said sub base in juxtaposition with said plate.

* * * * *